United States Patent

Nel

[11] Patent Number: 5,958,355
[45] Date of Patent: Sep. 28, 1999

[54] PROCESS FOR REACTING A ZIRCONIA BASED MATERIAL

[75] Inventor: Johannes Theodorus Nel, Kempton Park, South Africa

[73] Assignee: Atomic Energy Corporation of South Africa Limited, Pelindaba, South Africa

[21] Appl. No.: 08/849,204
[22] PCT Filed: Nov. 30, 1995
[86] PCT No.: PCT/US95/15556
§ 371 Date: Jun. 2, 1997
§ 102(e) Date: Jun. 2, 1997
[87] PCT Pub. No.: WO96/16903
PCT Pub. Date: Jun. 6, 1996

[30] Foreign Application Priority Data

Dec. 2, 1994 [ZA] South Africa ............................ 94/9602

[51] Int. Cl.$^6$ .................................................. C01G 25/04
[52] U.S. Cl. ............................ 423/472; 423/341; 423/82; 423/608
[58] Field of Search .............................. 423/82, 489, 472, 423/608, 341

[56] References Cited

U.S. PATENT DOCUMENTS

| 1,618,286 | 2/1927 | Kinzie | 423/341 |
| 3,119,661 | 1/1964 | Stambaugh et al. | 423/608 |
| 3,341,304 | 9/1967 | Newby | 423/82 |
| 4,047,970 | 9/1977 | Morriss et al. | 106/451 |
| 4,053,320 | 10/1977 | Williamson et al. | 501/103 |
| 4,361,542 | 11/1982 | Arendt | 423/82 |
| 5,688,477 | 11/1997 | Nel | 423/82 |

FOREIGN PATENT DOCUMENTS

| 762066 | 4/1934 | France. |
| 220358 | 8/1924 | United Kingdom. |
| 1373661 | 11/1974 | United Kingdom | 423/82 |

OTHER PUBLICATIONS

Zeitschrift Fur Anorganische Chemie, vol. 141, 1924, pp. 284–288, XP 000567218 J.H. De Boer 'Die Trennung Von Zirconium Und Hafnium Duch Kristallisation Ihrer Ammoniumdoppelfluoride' See pp. 287–288, no month.

Zeitschrift Fur Anorganische Chemie, vol. 97, 1917, pp. 73–112, Von Otto Ruff 'Uber Die Herstellung Von Zirkongegenstanden' See pp. 110–112, no month.

Primary Examiner—Ngoc-Yen Nguyen
Attorney, Agent, or Firm—Ladas & Parry

[57] ABSTRACT

A process for reacting a zirconia-based material comprises reacting, in a reaction step, plasma dissociated zircon with aqueous hydrogen fluoride to produce a soluble fluoro zirconic acid compound.

13 Claims, 4 Drawing Sheets

PROCESS FOR REACTING A ZIRCONIA BASED MATERIAL

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

THIS INVENTION relates to the treatment of a chemical. It relates in particular to a process for treating a zirconia-based material.

2. Description of the Related Art including information disclosed under 37 CFR 1.97 and 1.98

Not applicable

BRIEF SUMMARY OF THE INVENTION

According to the invention, there is provided a process for treating a zirconia-based material which comprises, broadly, reacting, in a reaction step, a zirconia-based material with aqueous hydrogen fluoride (HF), to produce a soluble fluorozirconic acid compound.

In one embodiment of the invention, the zirconia-based material may be zirconia. In another embodiment of the invention, it may be dissociated zircon ('DZ' or $ZrO_2.SiO_2$). In yet another embodiment of the invention, it may be a zirconia-containing component of dissociated zircon.

When zirconia is used, it may be a naturally occurring zirconium material such as baddeleyite. The reaction then proceeds in accordance with reaction (1):

$$ZrO_2 + 6HF \rightarrow H_2ZrF_6 + 2H_2O \tag{1}$$

Instead, when zirconia is used, it may be that obtained by any suitable thermal process.

The dissociated zircon, when used, can be that obtained by any suitable process, particularly a thermal process. Thus, for example, it can be that obtained by destroying the crystal matrix of zircon ($ZrSiO_4$) by heating it to a high temperature in a plasma furnace or a plasma generator, under oxidizing, inert or reducing conditions. Zircon is a mineral which is abundantly available at relatively low cost, but is chemically inert. Thus, inert zircon mineral is rendered amenable to chemical processing in accordance with the invention, by means of said plasma dissociation. During plasma dissociation, zircon is dissociated into separate zirconia ($ZrO_2$) and silica ($SiO_2$) mineral phases, with the product commonly designated as dissociated zircon ('DZ'), plasma dissociated zircon ('PDZ'), or $ZrO_2.SiO_2$. Alternatively, the zircon can be processed in a transfer arc plasma furnace under reducing conditions effecting essentially the removal of the silica phase with essentially $ZrO_2$, popularly designated fused zirconia, remaining behind.

Zircon normally contains radioactive elements such as uranium (U) and thorium (Th) and their decay product elements, as well as other common impurities such as Fe, Ca, P, Al, Mg and Ti. These elements are released in the process of the invention, but the process provides an effective manner of dealing with these elements. In particular, the process results in the generation of only relatively small quantities of radioactive element containing wastes. Wherever reference is made in this specification to U and Th as radioactive elements, this is to be interpreted as referring instead or additionally also to their decay products.

In one embodiment of the invention, the PDZ may be non-desilicated, in which case the reaction proceeds in accordance with reaction (2):

$$ZrO_2.SiO_2 + 12HF \rightarrow H_2ZrF_6 + H_2SiF_6 + 4H_2O \tag{2}$$

In another embodiment of the invention, the PDZ may be partially desilicated, in which case the reaction to produce the fluorozirconic acid is also in accordance with reaction (2).

In yet a further embodiment of the invention, the PDZ may be wholly desilicated, in which case the reaction to produce the fluorozirconic acid is in accordance with reaction (1), as given hereinbefore.

The desilication of the PDZ can be effected by known means, such as caustic soda leaching. Wholly or partially desilicated PDZ is also known as 'DPDZ'.

It is to be appreciated that whenever, in the reactions of the process of the invention, reference is made to hexafluorozirconic acid ($H_2ZrF_6$), this includes the compound $ZrF_4.2HF.xH_2O$ where x can range from 0 to 5.

The concentration of the HF in the aqueous HF or HF solution may be in the range of 5–70% HF by mass. The reaction may be effected at a moderately elevated temperature, which may be between 20° C. and 120° C. Reactions (1) and (2) are exothermic. Thus, with a 40% HF solution and using PDZ as feed material, the reaction mixture reaches a temperature of ±90° C. within a few minutes, depending on the rate of feeding the PDZ into the HF solution. At lower HF concentrations, for example 30%, lower final temperatures are reached and in such cases it is preferable to heat the reaction mixture from an external source, for example to >80° C. for complete reaction to take place.

The reaction period may be between 10 minutes and 4 hours, depending on the HF concentration, the degree of dissociation of the PDZ and the temperature of the reaction mixture.

Instead of, or in addition to hexafluorozirconic acid, ie $H_2ZrF_6$, tetrafluorozirconic acid, ie $H_2ZrOF_4$, and/or hydrates thereof, can be formed.

It will be appreciated that, in the reaction step, the zirconia and, when present, silica are dissolved in the HF solution, with the reaction products such as $H_2ZrF_6$ and $H_2SiF_6$ also being soluble in the aqueous hydrogen fluoride, so that only zircon that was not dissociated in the plasma, as well as poorly soluble or insoluble impurities or trace element such as U, Th, iron (Fe), titanium (Ti), aluminium (Al) and calcium (Ca) remain as more or less undissolved solids. The undissolved solids ('white fraction') can thus be removed as a solids fraction by suitable means, such as filtration, decantation or settling, optionally preceded, if necessary, by precipitation of the trace element(s) in question. The process accordingly provides an effective means of purifying PDZ or DPDZ to produce a relatively small quantity of residue containing undesirable contaminants such as U and Th, and their decay products.

Any residual zircon which was not dissociated in the plasma can thus be separated out, so that the process is not dependent on the availability of PDZ with 100% degree of dissociation. The zircon which is removed during this step can naturally be recycled back to the plasma stage, after separation of non-zircon materials.

To enhance or optimize efficiency of reaction (2) and to reduce or minimize losses of Zr and F to the white fraction, the molar ratio of HF to zirconia plus silica, when present, is important, and will be controlled to obtain desired dissolution levels. Thus, the molar ratio of HF to zircoia plus silica, when present, may be in the range 1.1:0.9 to 0.9:1.1, more preferably in the range 1.05:0.95 to 0.95:1.05, and most preferably about 1:1.

If desired, the solids fraction can be subjected to further treatment to recover elements such as U and Th. For example, it can be subjected to dissolution, eg utilizing suitable acids, eg nitric acid, or bases, followed by filtration and ion exchange, with, as stated hereinbefore, only small quantities of waste products being produced. Instead, any undissociated zircon can be separated from other insoluble compounds by means of physical separation, such as flotation, again resulting in substantially insignificant volumes of waste products.

The process may include heating the residual solution containing the $H_2ZrF_6$, $H_2SiF_6$, $H_2O$ and excess HF to recover $H_2ZrF_6$. Thus, the solution may, in an evaporation step, be heated to a temperature between 20° C. and 120° C. at substantially atmospheric pressure, with all $H_2SiF_6$, $H_2O$ and excess HF being evaporated. These volatiles can then be condensed in a suitable condenser for subsequent recovery of HF and Si species, such as $SiO_2$, in known fashion. The HF thus recovered can be recycled to the reaction step.

Thus, in the evaporation step, reaction (3) takes place:

$$H_2ZrF_6(aq)+H_2SiF_6(aq) \rightarrow H_2ZrF_6(s)+H_2SiF_6(g) \quad (3)$$

$H_2ZrF_6$ (or $H_2ZrOF_4$) crystals are obtained from this evaporation step, and the process thus enables substantially complete separation of all Zr and Si species.

The $H_2ZrF_6$ crystals can then be further purified, in a purification step, in accordance with reaction (4):

$$H_2ZrF_6(\text{impure}) \rightarrow H_2ZrF_6(\text{pure}) \quad (4)$$

The purification step may comprise recrystallization or ion exchange.

Instead, the $H_2ZrF_6$ solution can be only partially evaporated to produce a saturated solution from which $H_2ZrF_6$ crystals can be crystallized with or without cooling of the solution. These crystals can be separated from the mother liquid by any suitable means, for example filtration. These crystals can be of high purity due to the fact that most of the impurities remain in solution and are not crystallized with the Zr species. After filtration of the $H_2ZrF_6$ crystals, the remaining solution can be completely evaporated to recover all the remaining Zr as $H_2ZrF_6$ (or $H_2ZrOF_4$). These crystals will of course contain any accumulated impurities of the mother liquid.

As a further alternative, the $H_2ZrF_6/H_2SiF_6$ solution can be fed directly to an ion exchange column to produce a much purer $H_2ZrF_6/H_2SiF_6$ solution, from which pure $H_2ZrF_6$ crystals can be crystallized.

In one embodiment of the invention, the resultant pure $H_2ZrF_6$ can then be converted to zirconia, for example by means of steam pyrolysis, in accordance with reaction (5):

$$H_2ZrF_6+2H_2O \rightarrow ZrO_2+6HF \quad (5)$$

The HF produced in reaction (5) can be recovered and reused in the reaction step.

In other embodiments of the invention, other zirconium chemicals can instead be produced from the pure $H_2ZrF_6$, such as, for example, $ZrF_4$, $ZrOF_2$, fluorozirconates such as $K_2ZrF_6$, zirconium sulphate, or zirconium carbonate.

The invention will now be described by way of non-limiting example with reference to the accompanying drawings.

DETAILED DESCRIPTION OF THE INVENTION

Figure 1:
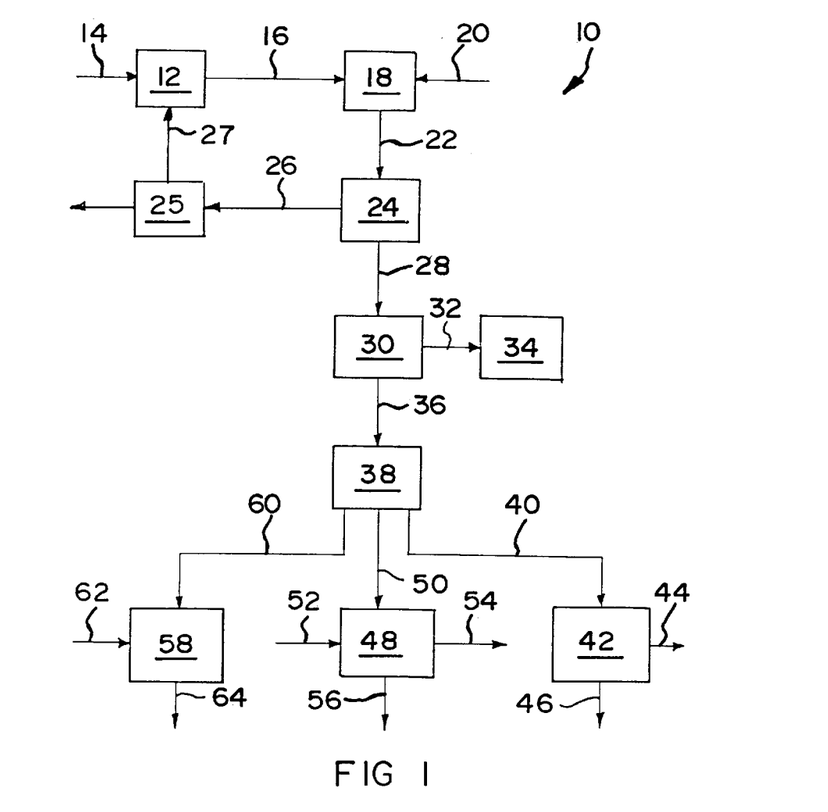
FIG. 1 is a simplified flow diagram of a process according to the invention for treating dissociated zircon.

In FIG. 1, reference numeral 10 generally indicates a process for treating dissociated zircon.

The process 10 includes a plasma dissociation stage 12, with a zircon feed line 14 leading into the stage 12. A PDZ flow line 16 leads from the stage 12 to a reaction step or stage 18, with a HF solution make-up line 20 leading into the stage 18. A transfer line 22 leads from the stage 18 to a liquid/solid separation step or stage 24. A zircon and white fraction withdrawal line 26 leads from the stage 24 to a zircon/white fraction separation stage 25, with a zircon return line 27 leading from the stage 25 back to the stage 12. A transfer line 28 leads from the stage 24 to an evaporation step or stage 30, with a volatile product withdrawal line 32 leading from the stage 30 to a treatment stage 34. A transfer line 36 leads from the stage 30 to a purification step or stage 38. A transfer line 40 leads from the stage 38 to a zirconia production step or stage 42, with a HF withdrawal line 44 as well as a $ZrO_2$ withdrawal line 46 leading from the stage 42. Instead, or additionally, a zirconium sulphate production step or stage 48 can be provided, with a flow line 50 then leading from the stage 38 to the stage 48. A $H_2SO_4$ feed line 52 will then also lead into the stage 48 with a HF withdrawal line 54 as well as a zirconium sulphate withdrawal line 56 leading from the stage 48. Instead, or additionally, a fluorozirconate production step or stage 58 can be provided, with a flow line 60 then leading from the stage 38 to the stage 58. A KOH feed line 62 then leads into the stage 58, with a fluorozirconate withdrawal line 64 leading from the stage 58.

In use, $ZrSiO_4$ is fed, by means of the flow line 14, into the plasma dissociation stage 12, together with recycled zircon entering the stage 12 along the flow line 26. In the stage 12, the zircon is dissociated, by means of plasma dissociation, into PDZ. The PDZ passes along the flow line 16 to the stage 18.

In the stage 18, the PDZ is dissolved in a HF solution having a concentration of between 5% and 70% HF, and a temperature of between 20° C. and 120° C., and reacts to form $H_2ZrF_6$ and $H_2SiF_6$ in accordance with reaction (2)

$$ZrO_2.SiO_2+12HF \; H_2ZrF_6+H_2SiF_6+4H_2O \quad (2)$$

The preferred HF concentration is 40% and the preferred temperature is 80° C., although the dissolution can also be effected at concentrations up to 100% HF.

The solution formed in the stage 18 and containing dissolved $H_2ZrF_6$, $H_2SiF_6$, $H_2O$ and excess HF, as well as any undissolved solids, passes to the liquid/solid separation stage 24 where a solids fraction comprising undissociated zircon as well as any undissolved or precipitated impurities such as U and Th is separated from a liquid fraction comprising excess HF solution, $H_2O$, dissolved $H_2ZrF_6$ and dissolved $H_2SiF_6$. The solids fraction is removed along the line 26, subjected to further treatment in the stage 25 to separate the white fraction from undissociated zircon, eg by means of dissolution in $H_2SO_4$, followed by filtration and ion exchange to remove therefrom the U and Th, before recycling the zircon to the stage 12 along the line 27. Thus, only relatively small volumes of U and Th containing waste are obtained from the process 10.

The liquid fraction passes along the line 28 to the stage 30 where a volatile fraction comprising $H_2SiF_6$, HF and $H_2O$ is withdrawn along the flow line 32, by distilling the solution at a temperature between 40° C. and 120° C. and at atmospheric pressure. The volatiles enter the stage 34 where they are condensed for recovery of HF and high grade Si species, with the HF being recycled (not shown) to the stage 18. Separation of the HF from the Si species can be effected by means of flame hydrolysis, steam plasma or the like.

Optionally, instead of the liquid fraction passing directly to the stage 30, it can first be fed into an ion exchange stage (not shown) for initial purification thereof, with the liquid fraction thereafter passing to the stage 30.

In the stage 30, substantially complete separation of Zr species from Si species is obtained. Thus, in a laboratory scale simulation of the process 10, it was found that the $H_2ZrF_6$ fraction from the stage 30 contained 46.1% by mass Zr and less than 0.5% by mass Si, while the volatile fraction from the stage 30, after condensation, contained 55.7 g/l $H_2SiF_6$, and less than 1 ppm Zr.

In the stage 30, when more than 20% of the liquid has evaporated, a highly saturated solution of $H_2ZrF_6$ is obtained. Depending on the amount of liquid that has evaporated, crystallization of the $H_2ZrF_6$ (or $H_2ZrOF_4$) takes place without cooling or upon cooling thereof to room temperature. This crystallization is in itself a further purification step with regard to impurities such as U, Th, Fe, Ti and Ca. The crystals can be removed from the residual solution by filtration, while the impurities remain largely in solution and can be removed subsequently by ion exchange (not shown).

Instead, in the stage 30, complete evaporation of the $H_2ZrF_6$ and $H_2SiF_6$ solution can be effected, with $H_2ZrF_6$ (or $H_2ZrOF_4$) crystals then being obtained. These crystals can be dried in an oven (not shown). If it is desired to minimize fluorine (F) losses during this drying step, the temperature should not exceed the decomposition temperature of $H_2ZrF_6$. Thus, the drying can be effected between 40° C. and 90° C., preferably at <80° C. The evaporation can be effected by any convenient means such as distillation, spray-drying or the like.

The relatively impure $H_2ZrF_6$ from the stage 30 passes to the purification stage 38.

The impure $H_2ZrF_6$ crystals which pass from the stage 30 are highly soluble in water, and solubilities of up to 1 g/ml of water are obtainable. Further purification of these crystals can thus easily be effected by dissolution and subsequent recrystallization, or ion exchange, in the stage 38, to produce $H_2ZrF_6$ having substantially reduced radioactivity.

For recrystallization, the $H_2ZrF_6$ crystals are dissolved in the minimum volume of warm water, to produce a highly saturated solution. On cooling to room temperature, recrystallization takes place. The resultant crystals can be recovered by means of filtration, and dried.

Instead, for ion exchange, the $H_2ZrF_6$ crystals can be dissolved in water in a concentration range of 0.1M to 2.0M.

This solution can then be passed through a column containing a suitable ion exchange resin for removing impurities such as U and Th. The solution is again evaporated to produce $H_2ZrF_6$ crystals in which the concentration of impurities, especially U and Th, is significantly reduced. The U and Th contaminants can subsequently be eluted from the ion exchange resin in easily manageable confined volumes.

EXAMPLE 1

In a laboratory scale simulation of the various steps of the process 10, the following results were obtained:

TABLE 1

Purifying action effected in the various steps of the process of the present invention.

| SAMPLE | Zr (%) | Si (%) | Ca (%) | Ti (%) | Fe (%) | U (ppm) | Th (ppm) |
|---|---|---|---|---|---|---|---|
| PDZ entering stage 18 | 47.9 | 15.4 | 0.085 | 0.059 | 0.048 | 350 | 140 |
| Filtered out undissolved impurities leaving stage 24 along the flow line 26 | 44.9 | 0.8 | 2.688 | 0.018 | 0.050 | 1169 | 1891 |
| $H_2ZrF_6$/$H_2ZrOF_4$ leaving stage 30 along flow line 36 | 45.8 | <0.2 | <0.01 | 0.035 | 0.04 | 167 | 48 |
| Recrystallized $H_2ZrF_6$ ($H_2ZrOF_4$) leaving stage 38 along the flow lines 40, 50, 60 | 45.2 | <0.02 | <0.01 | <0.01 | <0.01 | 42 | <20 |
| Ion exchange Before, ie entering stage 38 | | | | 0.027 | 0.03 | 145 | 71 |
| After, ie leaving stage 38 | | | | <0.01 | <0.01 | 83 | <20 |

The purified $H_2ZrF_6$ crystals from the stage 38 can be converted, in the stage 42, to zirconia ($ZrO_2$) by means of steam pyrolysis, at temperatures between 450° C. and 850° C., for reaction periods ranging from 30 minutes to 3 hours in a suitable oven, such as a rotary kiln, in accordance with reactions (6) and (7):

$$H_2ZrF_6 + 2H_2O(steam) \rightarrow ZrO_2 + 6HF \quad (6)$$

$$H_2ZrOF_4 + H_2O(steam) \rightarrow ZrO_2 + 4HF \quad (7)$$

Further desilication is effected during the steam pyrolysis.

Figure 2:
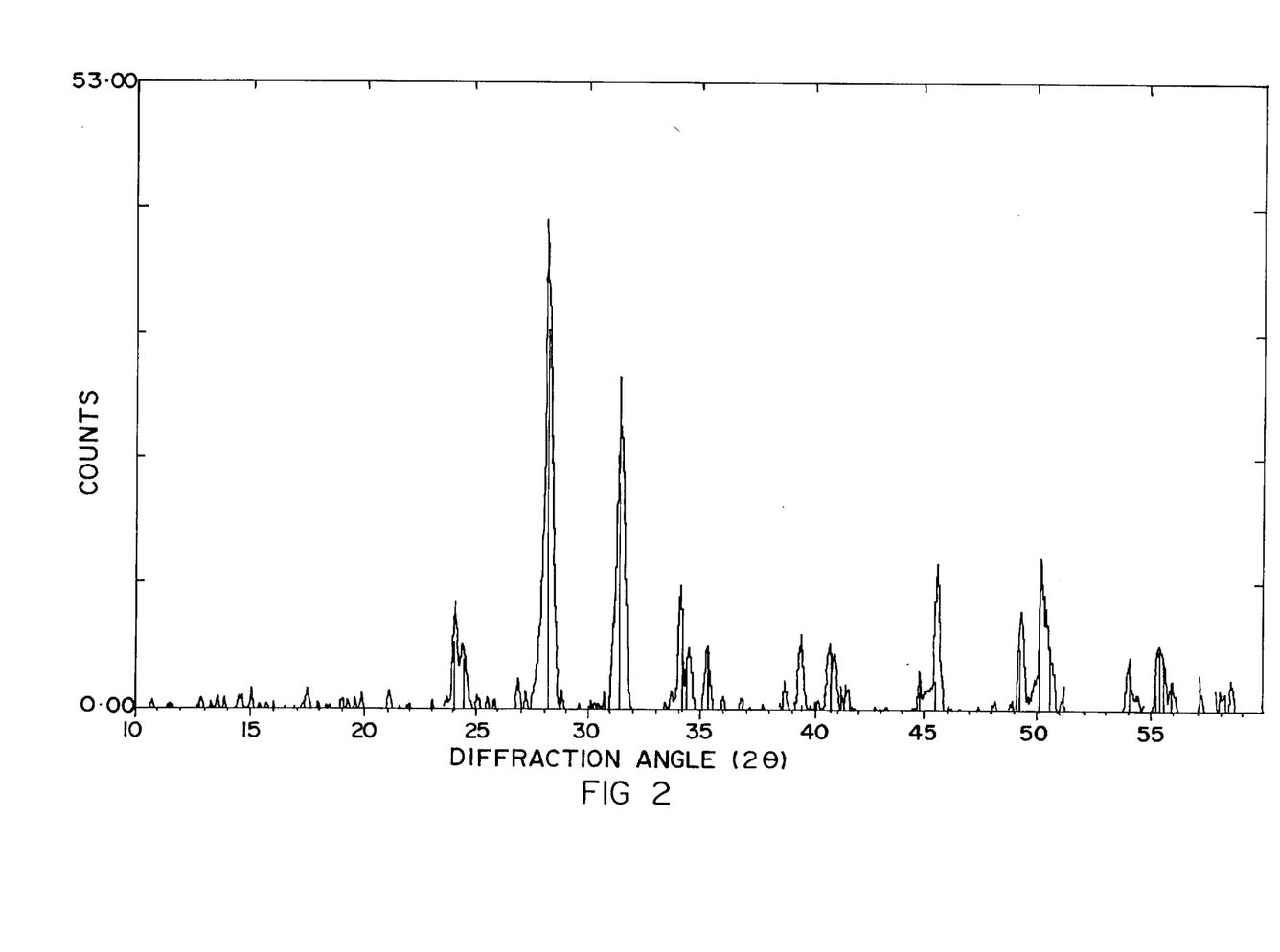
FIG. 2 is an X-ray diffraction pattern of $ZrO_2$ produced in Example 1.

An X-ray diffraction pattern of zirconia produced in this manner in the laboratory scale simulation of the process 10 is given in FIG. 2.

Efficient conversion of $H_2ZrF_6$ to $ZrO_2$ in the stage 42 is not primarily dependent on feeding the $H_2ZrF_6$ as dry crystals. Apart from steam pyrolysis conversion, final evaporation can also be effected in the rotary kiln. Thus, the crystallization effected in the stages 30, 38 can be avoided so that the $H_2ZrF_6$/$H_2SiF_6$ solution from the stage 24 can be fed directly into the stage 42, or after partial concentration thereof by evaporation.

The HF that is liberated in the stage 42 can be trapped in a suitable condenser or scrubber (not shown) and the thus recovered HF can be recycled to the stage 18.

Instead, or additionally, zirconium sulphate can be produced in the stage 48 by reacting the $H_2ZrF_6$ with $H_2SO_4$, with HF also being liberated for recycling.

Yet further, $K_2ZrF_6$ can be produced in the stage 58 by reaction of $H_2ZrF_6$ with any suitable potassium salt, for example KOH.

Still further, the $H_2ZrF_6$ can be converted thermally to $ZrF_4$ in a HF atmosphere (not shown) and the resultant $ZrF_4$ purified by means of sublimation/desublimation.

Further tests to simulate and test the process 10 were also conducted, on a larger scale than Example 1.

Figure 3:
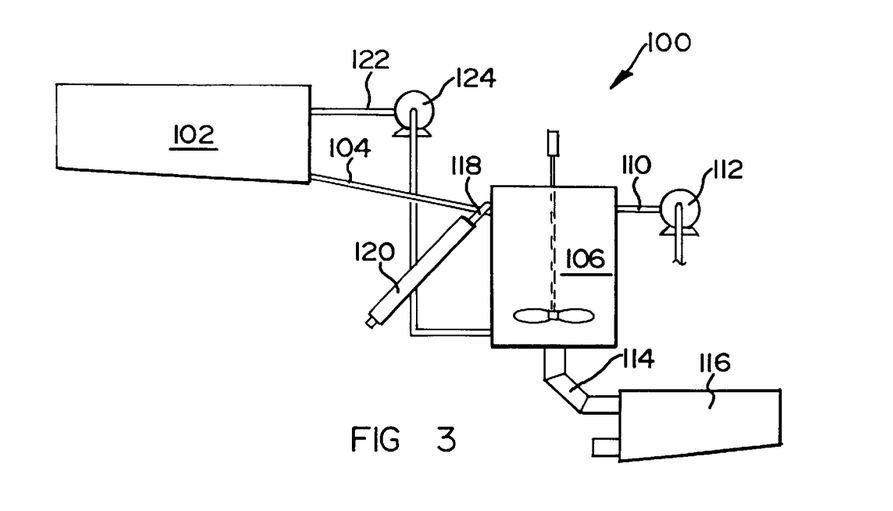
FIG. 3 shows, in simplified flow diagram form, a small scale production set-up as used in Examples 5 to 7.

Examples 2 to 4 and 8 to 10 were done on laboratory apparatus, while Examples 5 to 7 were carried out on a small scale production setup, in accordance with FIG. 3.

In FIG. 3, reference numeral 100 generally indicates the small scale production setup. The setup 100 comprises a liquid storage tank 102, with a flow line 104 leading from the tank 102 to a stirred reactor 106. An HF solution flow line 110, fitted with a pump 112, leads into the reactor 106, while a solids withdrawal line 114 leads from the bottom of the reactor to a solids storage tank 116. The reactor 106 is fitted with heating and cooling loops (not shown) and a volatiles withdrawal line 118, fitted with a condenser 120, leads from the reactor 106. A liquid recycle line 122 leads from the reactor 106 back to the tank 102, and is fitted with a pump 124.

In each of Examples 5 to 7, the first step in the production of $H_2ZrF_6$ was to pump the required amount of 40% HF into the reactor along the flow line 110.

PDZ was then fed into the reactor, under agitation, using a solids feed hopper (not shown) situated on the reactor lid.

The solids in the reaction mixture were separated from the liquid product phase using known settling techniques, after which the product (liquid) phase was pumped, along line 122, to the liquid storage tank 102. The solids were flushed, along line 114, to the solids storage tank 116 and the reactor washed.

The product phase was then fed back into the reactor along line 104, where separation between $H_2ZrF_6$ and $H_2SiF_6$ was done by evaporation of the volatile $H_2SiF_6$, $H_2O$ and HF. The vapours were condensed and analysed. The residue after evaporation was a slurry of $H_2ZrF_6/H_2ZrOF_4$ crystals.

EXAMPLE 2

500 g of plasma dissociated zircon ('PDZ') (with a total dissociation of 90%) was added to 1.4 l of a 40% aqueous HF solution in a 5 l PTFE beaker. The reaction mixture was continuously stirred throughout the reaction period. The temperature of the reaction mixture rose from 24° C. to 86° C. within 2 minutes. After 4 hours, the reaction mixture was allowed to cool, and the undissolved solids were separated from the mother liquid by means of filtration and/or decantation/sedimentation.

Figure 4:
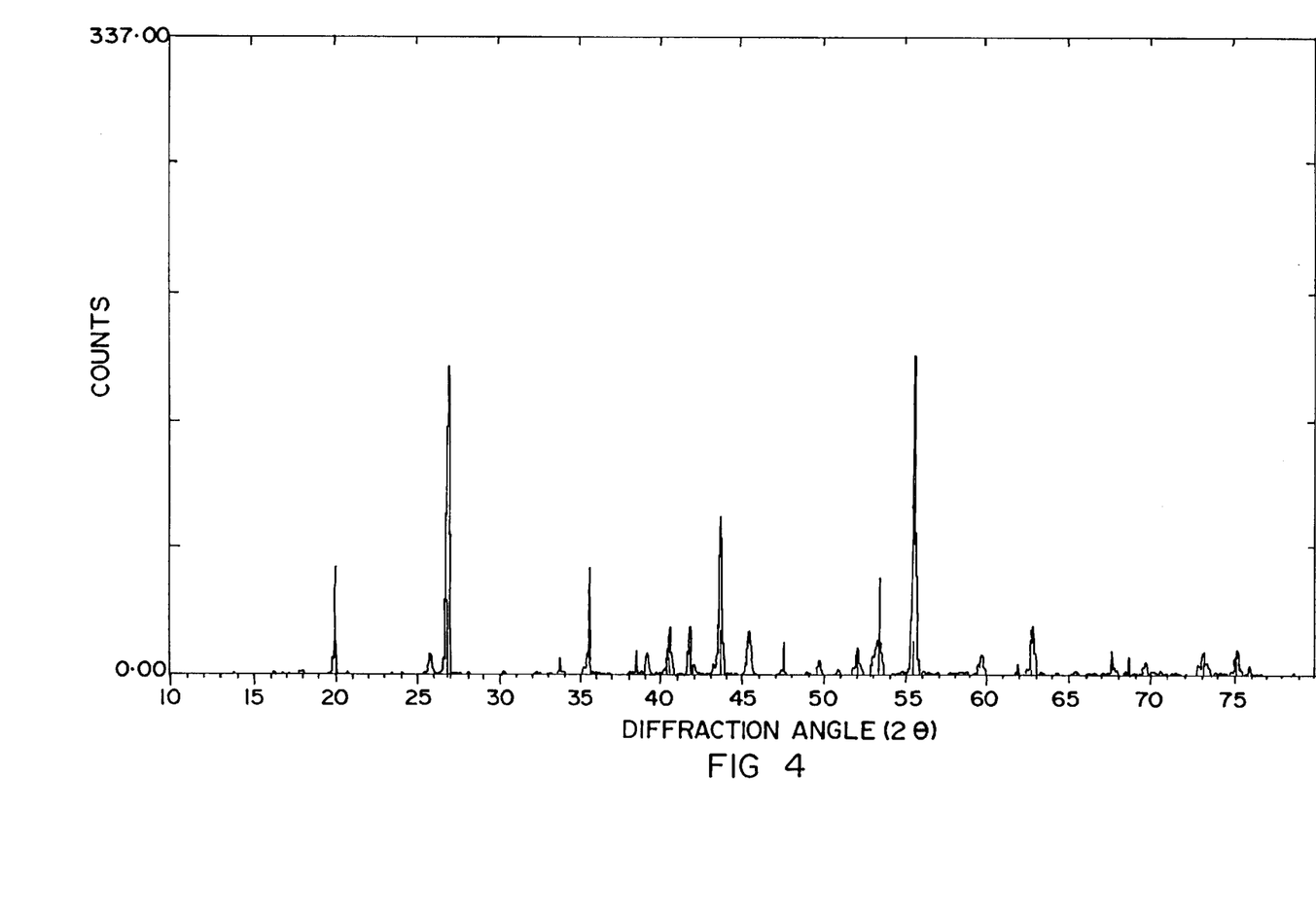
FIG. 4 is an X-ray diffraction pattern of undissociated zircon that did not dissolve in HF, as described in Example 2.

The solids consisted of a fine white fraction and undissociated zircon. The mass of the zircon portion was 45.0 g (9% of the original starting material). This corresponds well with the 90% dissociation of the starting material. X-ray diffraction (XRD) analysis confirmed that this portion of the solids was mainly zircon—see FIG. 4. The mass of the white fraction was 31.8 g (6.4% of the original starting material). XRD analysis of the white fraction showed that it consisted of a mixture of $ZrO_2$, $ZrOF_2$, $ZrF_4$ and intermediate oxyfluorides.

The mother liquid was evaporated at a temperature >80° C. After all the liquid had evaporated, 348.5 g of $H_2ZrF_6$ (or $H_2ZrOF_4$) crystals remained in the beaker.

The chemical analysis of the unreacted zircon, the white fraction and the final product are given in Table 2.

TABLE 2

| Sample | % Zr | % Si | % Hf | % F⁻ | ppm Al | ppm Ca | ppm Fe | ppm Ti | ppm U | ppm Th |
|---|---|---|---|---|---|---|---|---|---|---|
| Unreacted zircon | 50.3 | 15.2 | 1.2 | 0.1 | 586 | 307 | 620 | 831 | 351 | 149 |
| White fraction | 58.6 | 3.4 | 1.4 | 13.4 | 2698 | 7640 | <100 | 1659 | 539 | 680 |
| Final Product | 58.3 | 0.03 | 1.5 | 37.2 | 568 | <100 | 246 | 563 | 238 | 69 |

EXAMPLE 3

100 ml of the mother liquid (obtained from a typical run as described in Example 2) was evaporated to 50 ml, and the solution allowed to cool. The crystals which formed were filtered off and dried. The filtrate was further evaporated until only dried crystals remained. Chemical analysis, summarized in Table 3 below, showed the crystals that formed after the evaporation of the first 50 ml of the mother liquid (sample A) were much purer than the crystals which formed with complete evaporation of the rest of the liquid (sample B).

TABLE 3

| Sample | Si ppm | Ti ppm | Al ppm | Fe ppm | Ca ppm | U ppm |
|---|---|---|---|---|---|---|
| A | <10 | <10 | 837 | 364 | <10 | 238 |
| B | <10 | 2047 | 14506 | 3781 | 84 | 406 |

It was also established that 24.77 g (82%) crystals formed after evaporation of 50% of the mother liquid (sample A) and a further 5.37 g (18%) crystals formed after complete evaporation of the filtrate (sample B).

EXAMPLE 4

Using the procedures and parameters of Example 2, it was demonstrated that the amount and the chemical composition of the white fraction can be manipulated by the amount of HF available for reaction. For example, 0.43 kg of plasma dissociated zircon, (with a total dissociation of 71%) was added to 910 ml of 40% aqueous HF solution. The reaction mixture was stirred throughout the reaction period. After cooling, all the solids were separated from the mother liquid by means of filtration and/or decantation/sedimentation. The dissociated zircon and the white fraction were further separated. The mass of the undissociated zircon was 121.4 g, which is 28.2% of the original starting material. This corresponds well with the starting material which was 71% dissociated. The mass of the white fraction was 154.8 g, which is 36% of the starting material.

The reaction $$ZrO_2.SiO_2 + xHF \rightarrow H_2ZrF_6 + H_2SiF_6 + 4H_2O \qquad (8)$$

was studied further by varying the molar ratio of HF to ($ZrO_2+SiO_2$) in the PDZ. It was found that the molar ratio of HF to zirconia and silica determined the composition and amount of the white fraction, as can be seen from Table 4.

TABLE 4

| Moles HF(x) used in reaction (8), ie in dissolution of $ZrO2.SiO_2$ | Weight % of product ($H_2ZrF_6$ + $H_2SiF_6$) formed from PDZ (initial) | Weight % of white fraction formed from PDZ (initial) |
| --- | --- | --- |
| 3 | 0 | 100 |
| 4 | 14.8 | 85.2 |
| 6 | 35.5 | 64.5 |
| 9.6 | 91.4 | 8.6 |
| 11.4 | 90.0 | 9.1 |
| 20.4 | 91.4 | 8.6 |
| 48 | 100 | 0 |

12 moles of HF is needed theoretically to dissolve the $ZrO_2.SiO_2$ fully.

EXAMPLE 5

40 l of a 40% HF mixture were pumped into the reactor 106. This gave a total of 18.56 kg pure HF.

17 kg of 79% PDZ having a mass of 13.43 kg PDZ, was gradually fed to the reactor. A temperature of 88° C. was reached due to the exothermic nature of the reaction. The mother liquor was analysed as follows:

| | |
| --- | --- |
| $H_2ZrF_6 =$ | 27.39% (mass base) |
| $H_2SiF_6 =$ | 18.37% |
| HF = | 0.46% |
| $H_2O =$ | 53.78% |

The white fraction produced in the reaction amounted to 322 g, which represented 2.4% of the actual mass of PDZ fed to the system. The total mass of $H_2ZrF_{6(s)}$ produced was 13.96 kg (actual) together with a mass of 9.71 kg $H_2SiF_{6(l)}$ (calculated).

EXAMPLE 6

Again 40f of 40% HF were pumped into the reactor 106, giving a total HF content of 18.56 kg HF.

18.4 kg of 73% PDZ, giving a mass of 13.43 kg PDZ, was fed to the reactor within 30 minutes. The temperature increased to >90° C. within 5 minutes, and cooling water was used to stabilize the temperature at between 80° C. and 90° C.

The mother liquor was analyzed as follows:

| | |
| --- | --- |
| $H_2ZrF_6 =$ | 26.98% (mass base) |
| $H_2SiF_6 =$ | 18.07% |
| HF = | 1.03% |
| $H_2O =$ | 53.92% |

The white fraction produced in the reaction amounted to 353 g, representing a fraction of 2.63% of the pure PDZ fed to the reactor. 13.75 kg $H_2ZrF_{6(s)}$ (actual) was produced in the run together with a mass of 9.56 kg $H_2SiF_{6(f)}$ (calculated)

EXAMPLE 7

In this example the setup or system 100 was run at full capacity.

45 l of 40% HF were pumped into the reactor 106, giving a nett mass of 20.34 kg HF. 17.85 kg 87% PDZ was fed to the reactor within 30 minutes, giving a nett mass of 15.53 kg PDZ. Cooling water was used to stabilize the temperature of the reacting mixture at 85° C.

The mother liquor was analysed as follows:

| | |
| --- | --- |
| $H_2ZrF_6 =$ | 26.74% (mass basis) |
| $H_2SiF_6 =$ | 17.03% |
| HF = | 2.57% |
| $H_2O =$ | 53.66% |

A total mass of 407 g white fraction was collected which represented 2.62% of the PDZ fed to the reactor. A total mass of 16.85 kg $H_2ZrF_{6(s)}$ (actual) was produced in the run together with a mass of 11.72 kg $H_2SiF_6$ (calculated).

In all the abovementioned examples, the crystals were formed by evaporating between 20% and 40% of the mother liquor. The crystals were extracted and the remaining liquor heated in containers to produce the rest of the $H_2ZrF_6$ crystals.

During the evaporation of the volatiles, samples were taken for analyses, as set out in Table 5.

Table 5 shows the compositions of the different samples taken as mass percentages. The total amount of condensate collected was 37% of the liquor (volume) used in the run. As a result of the ever-present HF in the system, no blockages due to $SiO_{2(s)}$ precipitation were found in the condenser. No Zr specie could be found in the condensate.

Typical analytical results of the materials used and produced in the reaction, in relation to radioactive components, are summarized in Table 6.

TABLE 5

Values obtained in respect of $H_2SiF_6$, HF and $H_2O$ in volatile fraations.

| Fraction | % $H_2SiF_6$ | % HF | % $H_2O$ |
| --- | --- | --- | --- |
| 1 | 1.85 | 2.84 | 95.31 |
| 2 | 3.57 | 4.37 | 92.06 |
| 3 | 4.81 | 4.61 | 90.58 |
| 4 | 6.95 | 4.65 | 88.40 |
| 5 | 10.67 | 4.23 | 85.10 |
| 6 | 15.28 | 4.22 | 80.50 |
| 7 | 24.73 | 2.75 | 72.52 |
| 8 | 32.38 | 1.53 | 66.09 |
| 9 | 36.02 | 2.32 | 61.66 |

TABLE 6

| SAMPLE | Alpha Radiation $-\alpha$ Bq/g | Beta Radiation $-\beta$ Bq/g | Uranium Concentration $-[U]$ μg/g | Thorium Concentration $-[Th]$ μg/g | Radiation from $^{226}$Ra | Radiation from $^{228}$Ra Bq/g | Radiation from $^{224}$Ra |
|---|---|---|---|---|---|---|---|
| PDZ raw material | 57 | 28 | 400 | 150 | 4.2 | 0.5 | 0.5 |
| H$_2$ZrF$_6$ | 14 | 7 | 166 | 61 | 0.4 | 0.04 | 0.18 |
| White fraction | 923 | 261 | 444 | 691 | 43 | 6.03 | 2.05 |

EXAMPLE 8

2 l of a solution containing H$_2$ZrF$_6$ and H$_2$SiF$_6$, with a uranium concentration of 89.5 μg/ml and 4.5% free hydrofluoric acid, was run through a 50.0 g Purolite S940 column at a flow rate of 1.32 cm/min. The column had an inner diameter of 38 mm. Twenty fractions of 100 ml were collected and analysed for uranium by neutron activation analysis. The analysis results showed that the resin was able to remove 81% uranium at 200 ml solution with a resulting resin capacity of 0.32 mg U/g resin. 90% breakthrough was reached at 2000 ml solution with a resulting capacity of 1.11 mg U/g resin.

EXAMPLE 9

29 l of a solution containing H$_2$ZrF$_6$ and H$_2$SiF$_6$, with a uranium concentration of 45.5 μg/ml and 7.7% free hydrofluoric acid, was run through a 50.0 g Purolite S940 column at a flow rate of 1.32 cm/min. The column had an inner diameter of 38 mm. Twenty fractions of 100 ml were collected and analysed for uranium by neutron activation analysis. The analysis results showed that the resin was able to remove 71% uranium at 200 ml solution with a resulting resin capacity of 0.15 mg U/g resin. Total breakthrough was reached at 1900 ml solution and the total capacity was 0.39 mg U/g resin.

EXAMPLE 10

8.75 g H$_2$ZrF$_6$ crystals were reacted with 402 g of superheated steam over a period of 2 hours in a static oven, at a temperature of 650° C. The evolved HF was condensed in a suitable condenser. 5.25 g of ZrO$_2$ was formed. XRD-analysis confirmed that the product was ZrO$_2$. The HF that was condensed, had a concentration of more than 40%. The purity of the ZrO$_2$ is summarized in Table 6.

TABLE 6

| % Zr | % Hf | % Si | % F$^-$ | ppm Ti | ppm Al | ppm Fe | ppm Ca | ppm U | ppm Th |
|---|---|---|---|---|---|---|---|---|---|
| 73.2 | 1.0 | 0.03 | 0.78 | <100 | 285 | 772 | 208 | 109 | 21 |

EXAMPLE 11

Figure 5:
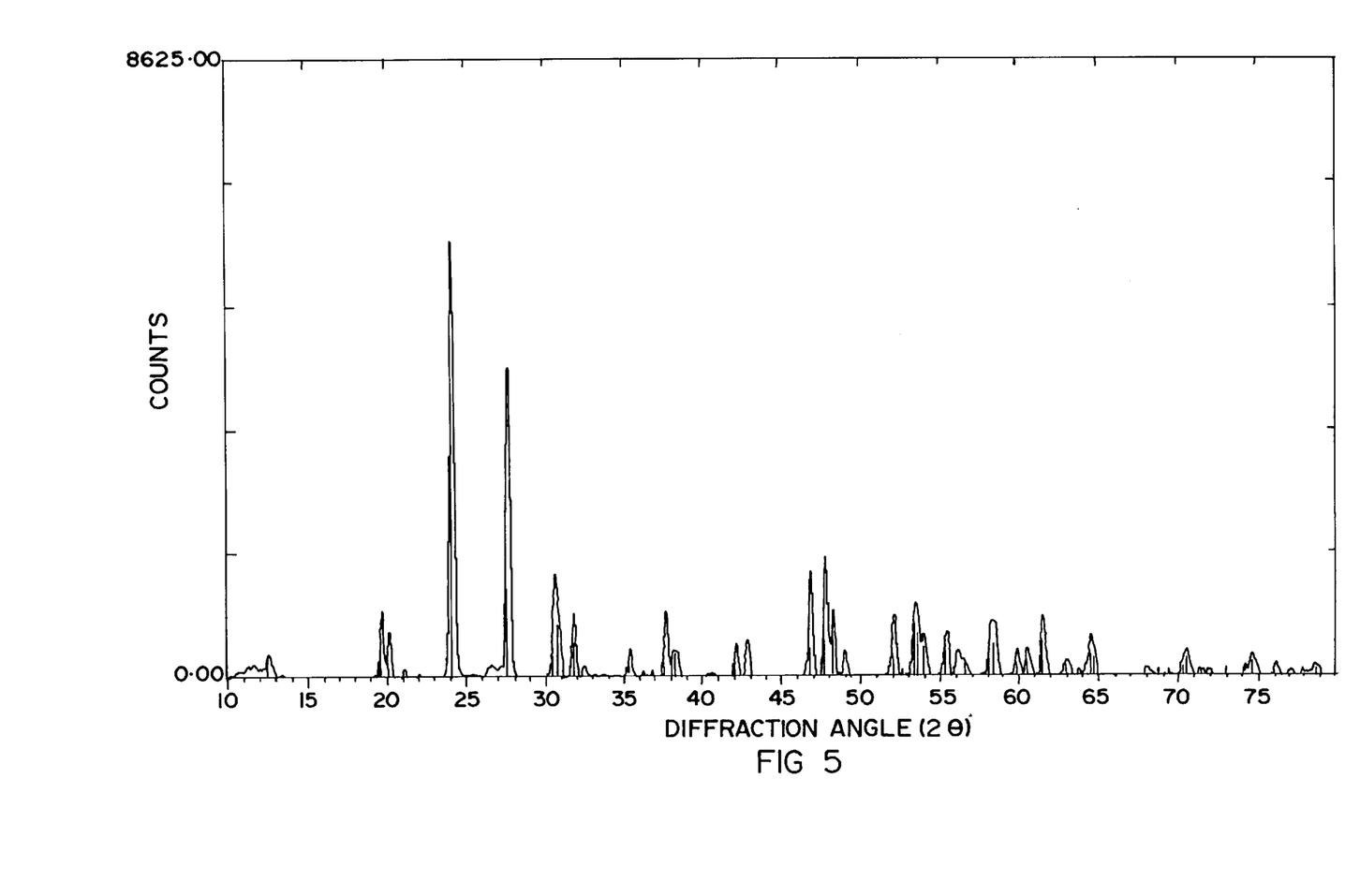
FIG. 5 is an X-ray diffraction pattern of $ZrO_2$ produced in Example 11.

1.5 kg H$_2$ZrF$_6$ crystals were reacted with 1 kg of superheated steam in a dynamic "paddle oven" at a temperature of 730° C. The feed rate of the solids to the oven was 50 g/min. The feed rate of the steam was 500 g/h. The average residence time of the solids in the oven was 3½ hours. XRD analysis confirmed that the product was ZrO$_2$—see FIG. 5. About 600 g of ZrO$_2$ was withdrawn from the product outlet, with the rest of the ZrO$_2$ still contained in the dead volumes in the inside of the oven. The purity of the final product is summarized in Table 7.

TABLE 7

| % Zr | % Hf | ppm Si | % F$^-$ | ppm Ti | ppm Al | ppm Fe | ppm Ca | ppm U | ppm Th |
|---|---|---|---|---|---|---|---|---|---|
| 69.1 | 1.1 | <10 | 0.30 | <10 | <10 | 901* | <10 | 425 | <10 |

*The high Fe content is due to corrosion contamination from a stainless steel oven component.

Thus, the process 10 is environmentally friendly in the sense that no unmanageable waste products are produced, and essentially all the HF is recovered for reuse, which enhances cost-effectiveness.

Further advantages of the process 10 include the following:

zirconium products with low U and Th content can be obtained in cost-effective manner from baddeleyite and zircon;

primary dissolution of the zirconia or DZ in the reaction stage 18 and secondary purification in the evaporation stage 30 is effected in the same medium, ie HF solution, leading to good efficacy and cost-effective processing;

feed contaminants such as Si, Fe, Ti, Al, U and Th are removed substantially entirely in a cost-effective manner by selective dissolution, selective precipitation, recrystallization, ion exchange and combinations hereof, as described hereinbefore;

any residual HF in any process or product stream can easily be rendered harmless by means of lime precipitation.

I claim:

1. A process for reacting a zirconia-based material which process comprises reacting, In a reaction step, plasma dissociated zircon with aqueous hydrogen fluoride, with the quantity of hydrogen fluoride, as aqueous hydrogen fluoride, used being such that the molar ratio of hydrogen fluoride to zirconia present in the plasma dissociated zircon is between 1.1:0.9 to 0.9:1.1 to produce a soluble fluoro zirconic acid compound.

2. A process according to claim 1, wherein the plasma dissociated zircon Is non-desilicated or partially desilicated so that, in addition to the soluble fluoro zirconic acid compound, a soluble fluoro silicic acid compound, is produced.

3. A process according to claim 2, wherein the concentration of the hydrogen fluoride in the aqueous hydrogen fluoride is, before reaction therewith with the plasma dissociated zircon, in the range of 5–70% hydrogen fluoride by mass, with the reaction being effected at a temperature between 20° C. and 120° C., and the reaction period being between 10 minutes and 4 hours.

4. A process according to claim 2, wherein the quantity of hydrogen fluoride, as aqueous hydrogen fluoride, used is approximately stoichiometric, on a molar basis, with respect to the zirconia component plus the silica component of the plasma dissociated zircon.

5. A process according to claim 2, which includes separating a liquid fraction comprising residual aqueous hydrogen fluoride, the soluble fluoro zirconic acid compound, and the soluble fluoro silicic acid compound, from a residual solids fraction comprising poorly soluble or insoluble impurities selected from a group consisting in U, Th, Fe, Ti, Al and Ca.

6. A process according to claim 5, which includes heating the liquid fraction to a temperature between 20° C. and 120° C. at substantially atmospheric pressure, to evaporate all the residual aqueous hydrogen fluoride and the fluoro silicic acid compound, with fluoro zirconic acid compound remaining as a purified solid fraction, and condensing the volatiles for subsequent recovery of hydrogen fluoride and silicon species.

7. A process according to claim 5, which includes purifying the fluoro zirconic acid compound which remains as the solid fraction, by means of redissolving, recrystallization or ion exchange, and converting the purified fluoro zirconic acid compound to zirconia by means of steam pyrolysis.

8. A process according to claim 5, which includes subjecting the residual solids fraction to further treatment to recover at least one element therefrom.

9. A process for reacting a zirconia-based material, which process comprises reacting, in a reaction step, non-desilicated or partially desilicated plasma dissociated zircon with aqueous hydrogen fluoride, to produce a soluble fluoro zirconic acid compound, as well as soluble fluoro silicic acid compound;

separating a liquid fraction comprising residual aqueous hydrogen fluoride, the soluble fluoro zirconic acid compound and the soluble fluoro silicic acid compound, from a residual solids fraction comprising poorly soluble or insoluble impurities selected from the group consisting in U, Th, Fe, Ti, Al and Ca;

heating the liquid fraction to evaporate the soluble fluoro silicic acid compound and aqueous hydrogen fluoride so that the fluoro zirconic acid compound remains as a purified solid fraction.

10. A process according to claim 9, wherein the concentration of the hydrogen fluoride in the aqueous hydrogen fluoride is, before reaction thereof with the plasma dissociated zircon, in the range of 5–70% hydrogen fluoride by mass, with the reaction of the plasma dissociated zircon with the aqueous hydrogen fluoride being effected at a temperature between 20° C. and 120° C., and the reaction period being between 10 minutes and 4 hours.

11. A process according to claim 9, wherein the quantity of hydrogen fluoride, as aqueous hydrogen fluoride, used is approximately stoichiometric, on a molar basis, with respect to the zirconia component plus the silica component of the plasma dissociated zircon.

12. A process according to claim 9, wherein the heating of the liquid fraction is effected at a temperature between 20° C. and 120° C. at substantially atmospheric pressure, the process including condensing the volatiles for subsequent recovery of hydrogen fluoride and silicon species.

13. A process according to 9, which includes further purifying the fluoro zirconic acid compound which remains as the purified solid fraction, by means of redissolving, recrystallization or ion exchange, and converting the purified fluoro zirconic acid compound to zirconia by means of steam pyrolysis.

* * * * *